US012732849B2

(12) United States Patent
Akl et al.

(10) Patent No.: US 12,732,849 B2
(45) Date of Patent: Sep. 8, 2026

(54) ENERGY USAGE REPORTING

(71) Applicant: QUALCOMM Incorporated, San Diego, CA (US)

(72) Inventors: Naeem Akl, Bridgewater, NJ (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 18/484,991

(22) Filed: Oct. 11, 2023

(65) Prior Publication Data

US 2025/0126503 A1 Apr. 17, 2025

(51) Int. Cl.
*H04W 24/10* (2009.01)
*H04L 12/14* (2006.01)

(52) U.S. Cl.
CPC ............ *H04W 24/10* (2013.01); *H04L 12/14* (2013.01)

(58) Field of Classification Search
CPC ........ H04W 24/10; H04W 4/24; H04L 12/14; H04L 12/1407; H04M 15/66
See application file for complete search history.

(56) References Cited

FOREIGN PATENT DOCUMENTS

CN 116074775 A * 5/2023 ............. H04W 4/24
CN 116963166 A * 10/2023 ........... H04W 24/10

* cited by examiner

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a network entity may transmit an energy usage report configuration associated with an energy usage policy. The network entity may receive a first energy usage report associated with the energy usage report configuration. The network entity may transmit a second energy usage report associated with the first energy usage report. Numerous other aspects are described.

30 Claims, 12 Drawing Sheets

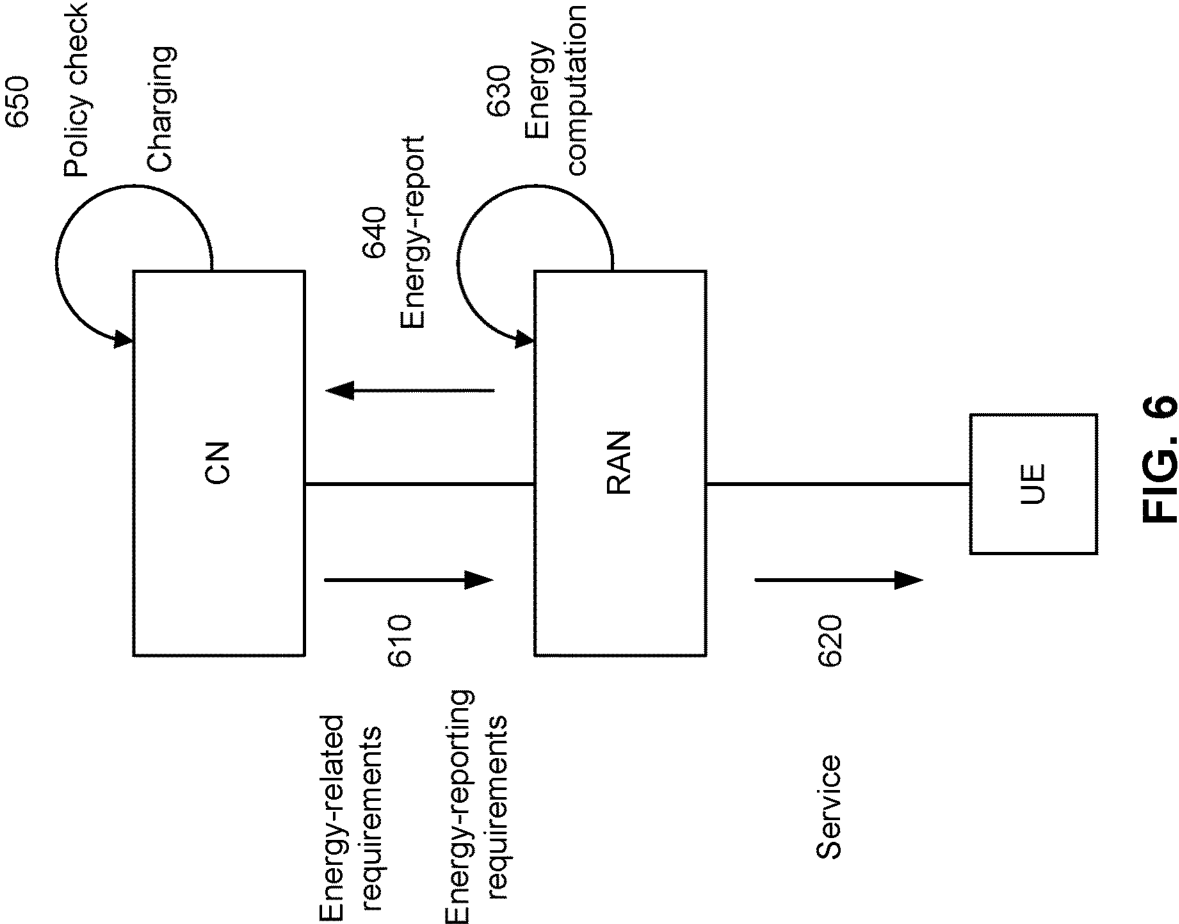
FIG. 6

ENERGY USAGE REPORTING

FIELD OF THE DISCLOSURE

Aspects of the present disclosure generally relate to wireless communication and to techniques and apparatuses for energy usage reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network entity for wireless communication. The network entity may include one or more memories and one or more processors coupled to the one or more memories. The one or more processors may be configured, individually or in any combination, to transmit an energy usage report configuration associated with an energy usage policy. The one or more processors may be configured, individually or in any combination, to receive a first energy usage report associated with the energy usage report configuration. The one or more processors may be configured, individually or in any combination, to transmit a second energy usage report associated with the first energy usage report.

Some aspects described herein relate to a policy control function (PCF) entity for wireless communication. The policy control function may include one or more memories and one or more processors coupled to the one or more memories. The one or more processors may be configured, individually or in any combination, to transmit an energy usage policy associated with an energy usage report configuration. The one or more processors may be configured, individually or in any combination, to receive, based at least in part on a first energy usage report associated with the energy usage report configuration, a second energy usage report associated with the first energy usage report.

Some aspects described herein relate to a charging function (CHF) entity for wireless communication. The charging function may include one or more memories and one or more processors coupled to the one or more memories. The one or more processors may be configured, individually or in any combination, to receive, based at least in part on a first energy usage report associated with an energy usage report configuration, a second energy usage report associated with the first energy usage report. The one or more processors may be configured, individually or in any combination, to transmit, based at least in part on the second energy usage report, a charging data record (CDR).

Some aspects described herein relate to a method of wireless communication performed by a network entity. The method may include transmitting an energy usage report configuration associated with an energy usage policy. The method may include receiving a first energy usage report associated with the energy usage report configuration. The method may include transmitting a second energy usage report associated with the first energy usage report.

Some aspects described herein relate to a method of wireless communication performed by a PCF entity. The method may include transmitting an energy usage policy associated with an energy usage report configuration. The method may include receiving, based at least in part on a first energy usage report associated with the energy usage report configuration, a second energy usage report associated with the first energy usage report.

Some aspects described herein relate to a method of wireless communication performed by a CHF entity. The method may include receiving, based at least in part on a first energy usage report associated with an energy usage report configuration, a second energy usage report associated with the first energy usage report. The method may include transmitting, based at least in part on the second energy usage report, a CDR.

Some aspects described herein relate to a non-transitory computer-readable medium that stores a set of instructions for wireless communication by a network entity. The set of instructions, when executed by one or more processors of the network entity, may cause the network entity to transmit an energy usage report configuration associated with an energy usage policy. The set of instructions, when executed by one or more processors of the network entity, may cause the network entity to receive a first energy usage report associated with the energy usage report configuration. The set of instructions, when executed by one or more processors of the network entity, may cause the network entity to transmit a second energy usage report associated with the first energy usage report.

Some aspects described herein relate to a non-transitory computer-readable medium that stores a set of instructions for wireless communication by a PCF entity. The set of instructions, when executed by one or more processors of the PCF entity, may cause the PCF entity to transmit an energy usage policy associated with an energy usage report configuration. The set of instructions, when executed by one or more processors of the PCF entity, may cause the PCF entity to receive, based at least in part on a first energy usage report associated with the energy usage report configuration, a second energy usage report associated with the first energy usage report.

Some aspects described herein relate to a non-transitory computer-readable medium that stores a set of instructions for wireless communication by one or more instructions that, when executed by one or more processors of a CHF entity. The set of instructions, when executed by one or more processors of the one or more instructions that, when executed by one or more processors of the CHF entity, may cause the one or more instructions that, when executed by one or more processors of the CHF entity to receive, based at least in part on a first energy usage report associated with an energy usage report configuration, a second energy usage report associated with the first energy usage report. The set of instructions, when executed by one or more processors of the one or more instructions that, when executed by one or more processors of the CHF, may cause the one or more instructions that, when executed by one or more processors of the CHF to transmit, based at least in part on the second energy usage report, a CDR. Some aspects described herein relate to an apparatus for wireless communication. The apparatus may include means for transmitting an energy usage report configuration associated with an energy usage policy. The apparatus may include means for receiving a first energy usage report associated with the energy usage report configuration. The apparatus may include means for transmitting a second energy usage report associated with the first energy usage report.

Some aspects described herein relate to an apparatus for wireless communication. The apparatus may include means for transmitting an energy usage policy associated with an energy usage report configuration. The apparatus may include means for receiving, based at least in part on a first energy usage report associated with the energy usage report configuration, a second energy usage report associated with the first energy usage report.

Some aspects described herein relate to an apparatus for wireless communication. The apparatus may include means for receiving, based at least in part on a first energy usage report associated with an energy usage report configuration, a second energy usage report associated with the first energy usage report. The apparatus may include means for transmitting, based at least in part on the second energy usage report, a CDR.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of an energy usage reporting process, in accordance with the present disclosure.

DETAILED DESCRIPTION

Figure 1:
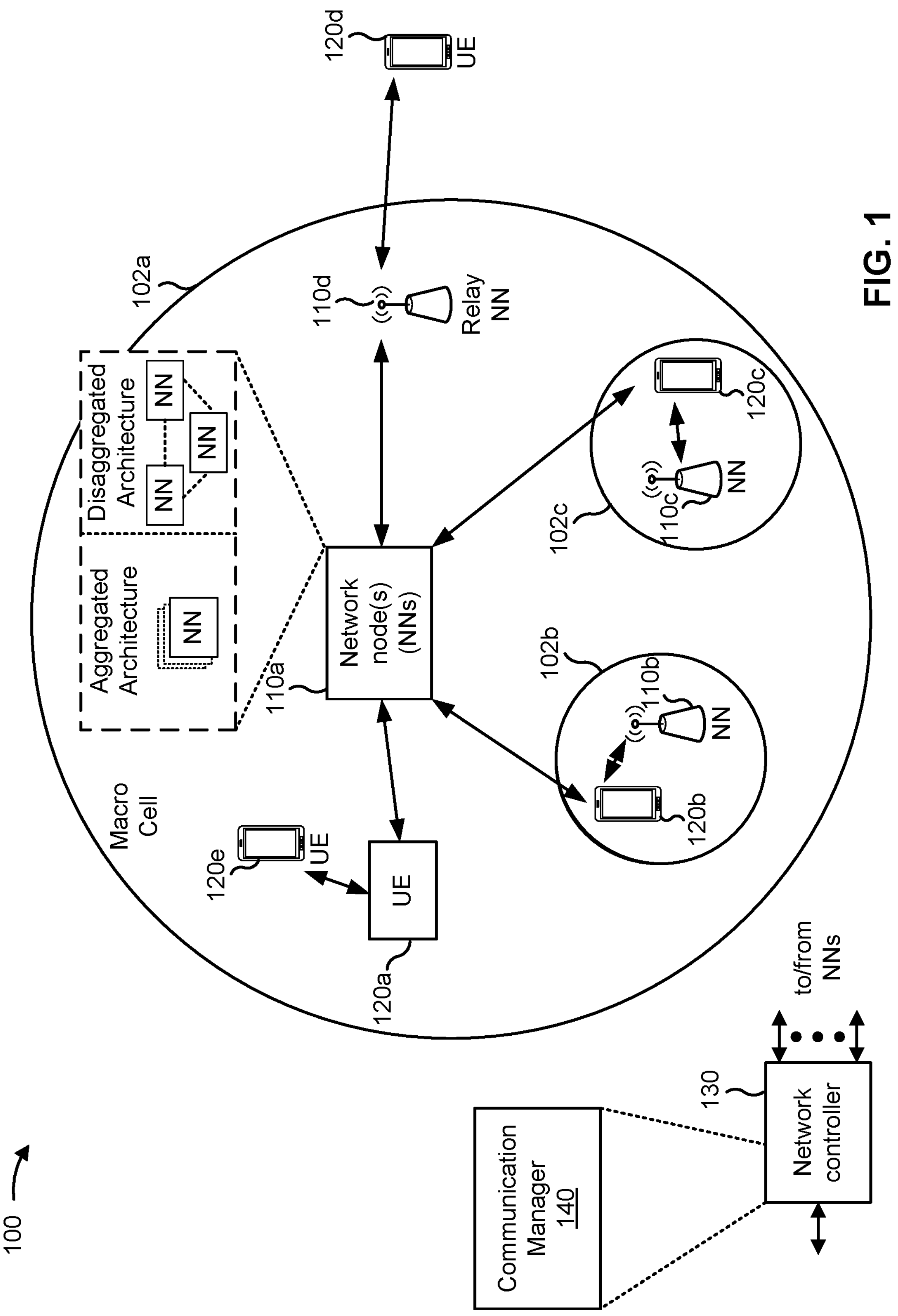
FIG. 1 is a diagram illustrating an example of a wireless network, in accordance with the present disclosure.

The topic of energy efficiency in communication networks is garnering increasing interest from network operators, standards organizations, the networking industry at large, and governmental bodies, and efforts are underway to offer energy efficiency as a service. Energy efficiency as a service allows a user equipment (UE) to receive a network service in an energy-efficient manner. For example, the UE may be authorized to consume a given amount of energy while using the network service for a given period of time.

Various technical issues hinder the development of energy efficiency as a service. Examples include how to offer energy efficiency as a service to application functions and subscribers, how to cap the energy consumed for specific services at a given energy consumption rate in the network, how to charge based on energy consumption, how to define different energy efficiency modes, or the like. These technical issues prevent network operators from offering energy efficiency as a service, which can increase energy usage in the UE and/or the network and impede efforts in the sustainability and green networks space.

Various aspects relate generally to energy usage reporting. Some aspects more specifically relate to energy-usage-aware policies and charging in a core network. In some examples, a policy control function (PCF) entity may transmit, and a network entity (e.g., an access and mobility management function (AMF) or a session management function (SMF)) may receive, an energy usage policy. The energy usage policy may indicate how to measure, report, and/or enforce energy usage associated with serving a UE. The network entity may transmit, and a network node may receive, an energy usage report configuration based on the energy usage policy. For example, the energy usage report configuration may configure the network node to report on the energy usage of the UE. The network node may transmit, and the network entity may receive, a first energy usage report associated with the energy usage report configuration. For example, the first energy usage report may contain energy usage information monitored and reported by the network node based or using the energy usage report configuration. The network entity may transmit, and the PCF entity or a charging function (CHF) entity may receive, a second energy usage report associated with the first energy usage report. The second energy usage report may contain some or all of the energy usage information contained in the first energy usage report. The CHF entity may transmit, and the billing domain may receive, based at least in part on the second energy usage report, a charging data record (CDR).

Particular aspects of the subject matter described in this disclosure can be implemented to realize one or more of the following potential advantages. In some examples, by transmitting the energy usage report configuration, receiving the first energy usage report, and/or transmitting the second energy usage report, the described techniques can be used to enable energy efficiency as a service. For example, transmitting the energy usage report configuration, receiving the first energy usage report, and/or transmitting the second energy usage report may provide an energy consumption information exchange framework for energy-usage-aware policies and charging in a core network. For example, the energy consumption information exchange framework may enable 5G core (5GC) network functions and/or the RAN to provide energy consumption reports on a per-slice, per-protocol-data-unit-session, or per-QoS-flow basis. Energy efficiency as a service may be offered to application functions and subscribers, and the energy consumed for specific services may be capped at a given energy consumption rate in the network.

The PCF entity transmitting the energy usage policy and/or receiving the first energy usage report may enable energy usage monitoring. Furthermore, the PCF entity may indicate one or more applicable energy efficiency modes in policy information. The CHF entity receiving the second energy usage report and/or transmitting the CDR may enable the CHF entity to introduce energy consumption information in CDRs and/or to introduce a maximum energy credit limit as a policy per service. Additionally, or alternatively, the CHF entity receiving the second energy usage report and/or transmitting the CDR may enable charging based on energy consumption (e.g., pricing may increase above a given energy consumption rate). For example, the CHF entity may charge based on one or more defined energy efficiency modes.

The network entity transmitting the energy usage report configuration to the network node and/or receiving the first energy usage report from the network node may enable the network entity to obtain energy usage information. For example, the network node may collect the energy usage information associated with a UE because the network node may be connected to the UE via an air interface.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network controller 130 (which may include a network entity, such as an AMF or an SMF, a PCF entity, or a CHF entity) may include a communication manager 140. As described in more detail elsewhere herein, the communication manager 140 may transmit an energy usage report configuration associated with an energy usage policy; receive a first energy usage report associated with the energy usage report configuration; and transmit a second energy usage report associated with the first energy usage report. In some aspects, the communication manager 140 may transmit an energy usage policy associated with an energy usage report configuration; and receive, based at least in part on a first energy usage report associated with the energy usage report configuration, a second energy usage report associated with the first energy usage report. In some aspects, the communication manager 140 may receive, based at least in part on a first energy usage report associated with an energy usage report configuration, a second energy usage report associated with the first energy usage report; and transmit, based at least in part on the second energy usage report, a CDR. Additionally, or alternatively, the communication manager 140 may perform one or more other operations described herein.

As indicated above, FIG. 1 is provided as an example. Other examples may differ from what is described with regard to FIG. 1.

Figure 2:
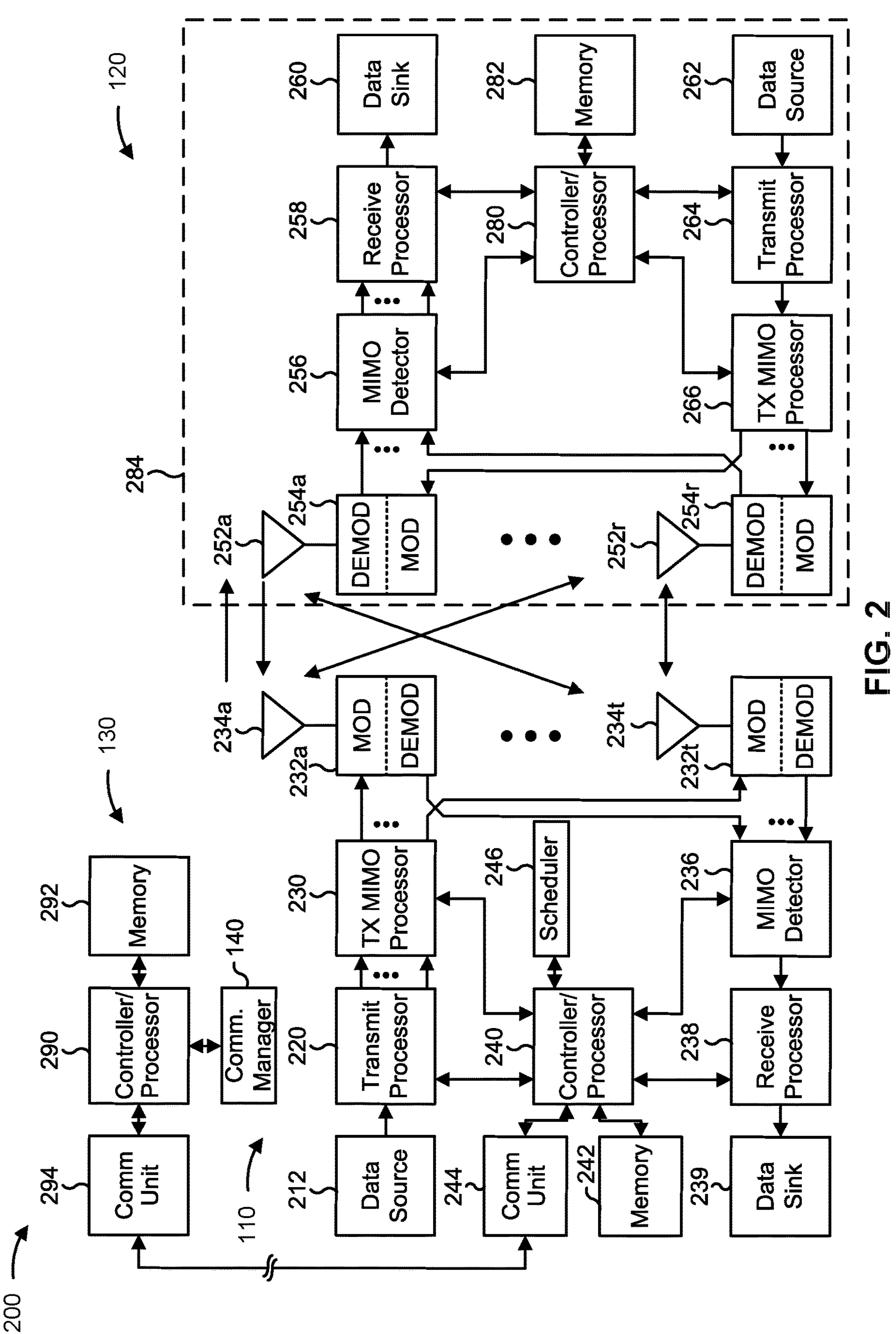
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with energy usage reporting, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, network controller 130 (e.g., the network entity, such as the AMF or the SMF) includes means for transmitting an energy usage report configuration associated with an energy usage policy; means for receiving a first energy usage report associated with the energy usage report configuration; and/or means for transmitting a second energy usage report associated with the first energy usage report. In some aspects, the network controller 130 (e.g., the PCF entity) includes means for transmitting an energy usage policy associated with an energy usage report configuration; and/or means for receiving, based at least in part on a first energy usage report associated with the energy usage report configuration, a second energy usage report associated with the first energy usage report. In some aspects, the network controller 130 (e.g., the CHF entity) includes means for receiving, based at least in part on a first energy usage report associated with an energy usage report configuration, a second energy usage report associated with the first energy usage report; and/or means for transmitting, based at least in part on the second energy usage report, a CDR. In some aspects, the means for the network controller 130 to perform operations described herein may include, for example, one or more of communication unit 294, a controller/processor 290, and a memory 292.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
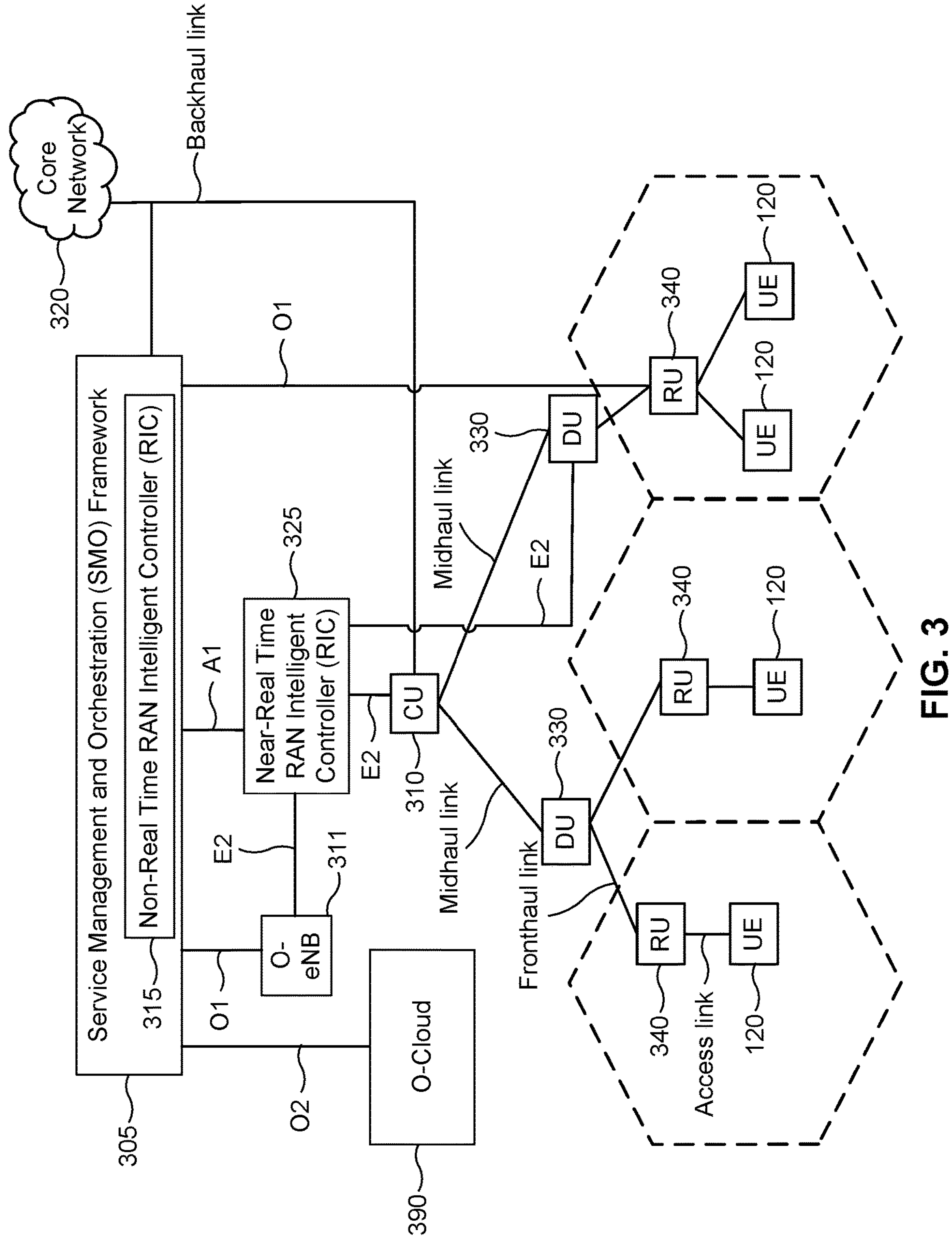
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 May communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-realtime aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
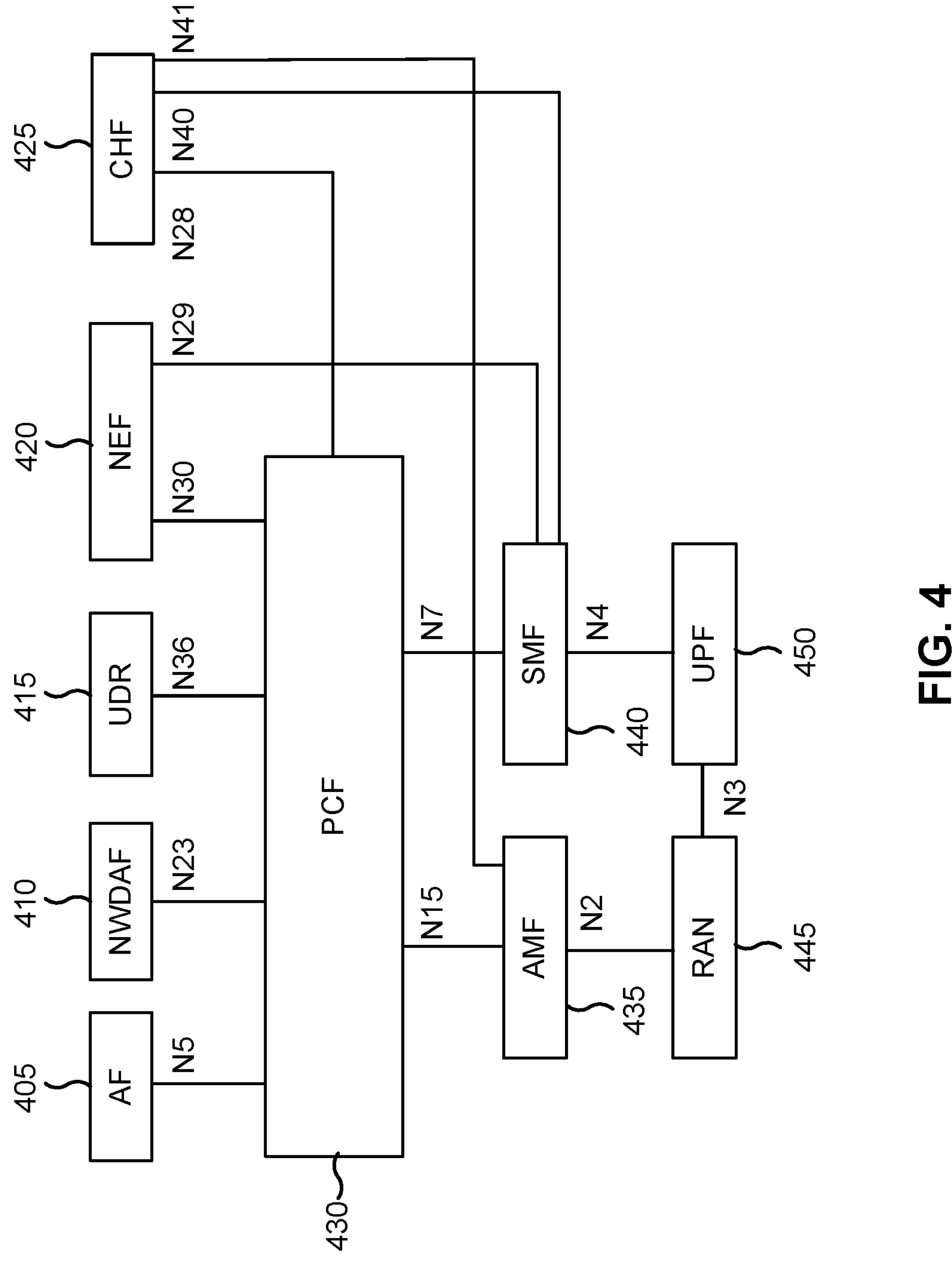
FIG. 4 is a diagram illustrating an example of a 5G network architecture that supports a wireless telecommunications system for data services, in accordance with the present disclosure.

FIG. 4 is a diagram illustrating an example 400 of a 5G network architecture that supports a wireless telecommunications system for data services, in accordance with the present disclosure.

The 5G network architecture includes an application function (AF) 405, a network data analytics function (NWDAF) 410, a unified data repository (UDR) 415, a network exposure function (NEF) 420, a CHF 425, a PCF 430, an AMF 435, an SMF 440, a RAN 445, and a user plane function (UPF) 450.

The AF 405 includes one or more devices that support application influence on traffic routing, access to the NEF 420, and/or policy control, among other examples.

The NWDAF 410 includes one or more devices that support data collection and analysis associated with the wireless telecommunications system.

The UDR 415 includes one or more devices that support storage of subscription information (e.g., in a centralized database).

The NEF 420 includes one or more devices that support exposure of capabilities and/or events in the wireless telecommunications system to help other entities in the wireless telecommunications system discover network services.

The CHF 425 includes one or more devices that support usage data collection and billing. The CHF 425 may grant credit to the SMF 440. For example, interactions between the SMF 440 and the CHF 425 may be based on credits. For example, the CHF 425 may credit, to the SMF 440, a given quantity of bits that a UE may consume on a particular protocol data unit (PDU) session. The SMF 440 may be triggered, at the expiry of the credit, to report to the CHF 425 that the given quantity of bits has been consumed by the UE. The CHF may then determine whether to report additional credit to the SMF 440 or terminate service for the UE.

The PCF 430 includes one or more devices that provide a policy framework that incorporates network slicing, roaming, packet processing, and/or mobility management, among other examples. For example, the PCF 430 may configure one or more policies on the AMF 435 and/or the SMF 440. For example, interactions between the SMF 440 and the CHF 425 may be based on policy.

The AMF 435 includes one or more devices that act as a termination point for non-access stratum (NAS) signaling and/or mobility management, among other examples. The AMF 435 may provide, to the RAN 445, indications of UE and/or slice caps (e.g., per-UE or per-network-slice maximum usage thresholds).

The SMF 440 includes one or more devices that support the establishment, modification, and release of communication sessions in the wireless telecommunications system. For example, the SMF 440 may configure traffic steering policies at the UPF 450 and/or may enforce user equipment internet protocol (IP) address allocation and policies, among other examples. The SMF 440 may provide PDU session and/or QoS flow configurations to the RAN 445 and/or the UPF 450. The SMF 440 may report data usage to the PCF 430 for usage monitoring and/or to the CHF 425 for charging.

The RAN 445 may include one or more network nodes (e.g., network node 110).

The UPF 450 includes one or more devices that serve as an anchor point for intra-RAT and/or inter-RAT mobility. The UPF 450 may apply rules to packets, such as rules pertaining to packet routing, traffic reporting, and/or handling user plane QoS, among other examples. The UPF 450 may report served data to the SMF 440 on a per-PDU-session, per-service-data-flow, and/or per-QoS-flow basis.

A UE may access a data network via the RAN 445 and the UPF 450. For example, the UE may establish a PDU session with the data network via the RAN 445 and the UPF 450. The UPF 450 and the data network may transport data within the PDU session via one or more service data flows (SDFs). For example, in a streaming use case, the PDU session may be associated with one data SDF and one voice SDF. The RAN 445 and the UPF 450 may transport data within the PDU session via one or more QoS flows associated with one or more of the SDFs. The UE may support up to 256 PDU sessions.

As indicated above, FIG. 4 is provided as an example. Other examples may differ from what is described with respect to FIG. 4.

The topic of energy efficiency in communication networks is garnering increasing interest from network operators, standards organizations, the networking industry at large, and governmental bodies, particularly in the 6G context, and efforts are underway to offer energy efficiency as a service. Energy efficiency as a service allows a UE to receive a network service in an energy-efficient manner. For example, the UE may be authorized to consume a given amount of energy while using the network service for a given period of time.

Various technical issues hinder the development of energy efficiency as a service. Examples include how to offer energy efficiency as a service to application functions and subscribers, how to cap the energy consumed for specific services at a given energy consumption rate in the network, how to charge based on energy consumption, how to define different energy efficiency modes, or the like. These technical issues prevent network operators from offering energy efficiency as a service. Lack of energy efficiency as a service can increase energy usage in the UE and/or the network, and impedes efforts in the sustainability and green networks space.

Figure 5:
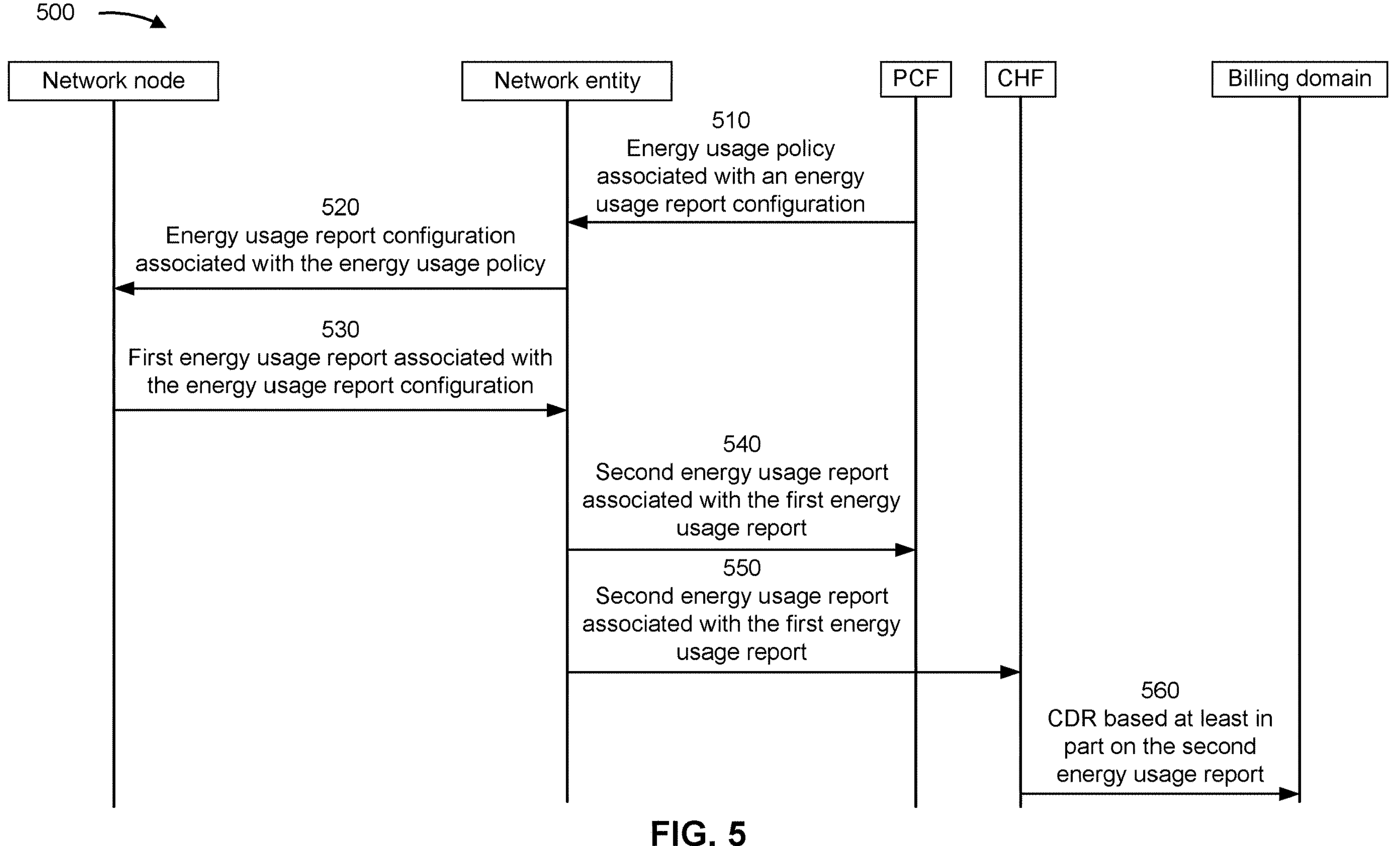
FIG. 5 is a diagram illustrating an example of energy usage reporting, in accordance with the present disclosure.

FIG. 5 is a diagram illustrating an example 500 of energy usage reporting, in accordance with the present disclosure. Example 500 involves communications between a network node (e.g., network node 110), a network entity (e.g., an AMF or an SMF), a PCF, a CHF, and a billing domain. The PCF may be an example of a PCF entity, which may be configured to perform one or more operations carried out by a PCF. The CHF may be an example of a CHF entity, which may be configured to perform one or more operations carried out by a CHF entity.

As shown by reference number 510, the PCF may transmit, and the network entity may receive, an energy usage policy (e.g., a dynamic energy usage policy). For example, the network entity may receive a reporting configuration provided by the PCF (and/or provided by the CHF) to the SMF for reporting to the PCF and/or to the CHF. Additionally, or alternatively, the energy usage policy may pre-configured in the network entity. For example, the energy usage policy may be a pre-configured energy usage policy to report energy usage to the PCF and/or to the CHF. In either case (e.g., where the energy usage policy is dynamic or pre-configured), the network entity may access the energy usage policy.

The energy usage policy may indicate how to measure, report, and/or enforce energy usage associated with serving a UE. In a case where the network entity is an AMF, the energy usage policy may indicate a maximum energy usage for a UE or for one or more network slices associated with (e.g., used by) the UE. In a case where the network entity is an SMF, the energy usage policy may be a policy and charging control (PCC) rule associated with an SDF associated with (e.g., used by) the UE, the energy usage policy may be associated with a QoS flow associated with (e.g., used by) the UE, or the energy usage policy may be associated with (e.g., configured for) a PDU session of the UE. For example, the energy usage policy may indicate a maximum energy usage for the SDF, the QoS flow, or the PDU session.

As shown by reference number 520, the network entity may transmit, and the network node may receive, an energy usage report configuration associated with the energy usage policy. For example, the network entity may generate the energy usage report configuration based on, or using, the energy usage policy. The energy usage report configuration may configure the network node to report on the energy usage of the UE. For example, in a case where the network entity is an SMF, the SMF may configure reporting on the RAN based on the energy usage policy. In a case where the network entity is an AMF, the AMF may forward the maximum energy usage to the network node based on the energy usage policy.

As shown by reference number 530, the network node may transmit, and the network entity may receive, a first energy usage report associated with the energy usage report configuration. For example, the first energy usage report may contain energy usage information monitored and reported by the network node based or using the energy usage report configuration. The network node (and/or one or more network functions (NFs)) may compute energy consumption/usage at any suitable level of granularity (e.g., per network slice, per PDU session, per QoS flow, or the like). The energy usage information may include an energy usage for a UE over a configured period of time. The network entity may use the first energy report for energy usage reporting.

As shown by reference number 540, the network entity may transmit, and the PCF may receive, a second energy usage report associated with the first energy usage report. For example, the second energy usage report may contain some or all of the energy usage information contained in the first energy usage report. In some aspects, the energy usage policy may be associated with energy usage monitoring. For example, the energy usage policy may enable the PCF to monitor the energy usage for the UE by collecting the energy usage reports (e.g., including the second energy usage report).

As shown by reference number 550, the network entity may transmit, and the CHF may receive, the second energy usage report associated with the first energy usage report. In some aspects, the energy usage policy may be associated with charging. For example, the energy usage policy may enable the CHF to perform charging operations based on the energy usage for the UE by collecting the energy usage reports (e.g., including the second energy usage report). The interaction between the network entity and the CHF may be based on the energy usage policy. For example, network entity may transmit the energy usage report to the CHF based on energy-usage-related triggers configured by the CHF.

Thus, the network entity may transmit the second energy usage report to the CHF and/or to the PCF based on the energy usage policy. In a case where the energy usage policy is associated with charging, the network entity may submit the second energy usage report to the CHF, and in a case where the energy usage policy is associated with energy usage monitoring, the network entity may submit the second energy usage report to the PCF. The second energy usage report transmitted to the PCF may be the same as, or different from, the second energy usage report transmitted to the CHF.

As shown by reference number 560, the CHF may transmit, and the billing domain may receive, based at least in part on the second energy usage report, a CDR. For example, the CHF may prepare the CDR based on the second energy usage report and report the CDR to the billing domain based on the energy used/consumed by the UE (e.g., as indicated in the second energy usage report). In some examples, the CHF may grant credit to the network entity based on the reported energy usage.

The network entity transmitting the energy usage report configuration, receiving the first energy usage report, and/or transmitting the second energy usage report may enable energy efficiency as a service. For example, transmitting the energy usage report configuration, receiving the first energy usage report, and/or transmitting the second energy usage report may provide an energy consumption information exchange framework for energy-usage-aware policies and charging in a core network. For example, the energy consumption information exchange framework may enable 5GC network functions and/or the RAN to provide energy consumption reports on a per-slice, per-PDU-session, or per-QoS-flow basis. Energy efficiency as a service may be offered to application functions and subscribers, and the energy consumed for specific services may be capped at a given energy consumption rate in the network.

The PCF transmitting the energy usage policy and/or receiving the first energy usage report may enable energy usage monitoring. Furthermore, the PCF may indicate one or more applicable energy efficiency modes in policy information. The CHF receiving the second energy usage report and/or transmitting the CDR may enable the CHF to introduce energy consumption information in CDRs and/or to introduce a maximum energy credit limit as a policy per service. Additionally, or alternatively, the CHF receiving the second energy usage report and/or transmitting the CDR may enable charging based on energy consumption (e.g., pricing may increase above a given energy consumption rate). For example, the CHF may charge based on one or more defined energy efficiency modes.

The network entity transmitting the energy usage report configuration to the network node and/or receiving the first energy usage report from the network node may enable the network entity to obtain energy usage information. For example, the network node may collect the energy usage information associated with a UE because the network node may be connected to the UE via an air interface.

As indicated above, FIG. 5 is provided as an example. Other examples may differ from what is described with respect to FIG. 5.

FIG. 6 is a diagram illustrating an example 600 of an energy usage reporting process, in accordance with the present disclosure. Example 600 involves communications between a core network ("CN"), a RAN, and a UE. The core network may include various network entities, such as an AMF, an SMF, a PCF, a CHF, and/or the like. The RAN may include one or more network nodes (e.g., network node 110). The UE may be connected to, and accessing services via, the RAN.

As shown by reference number 610, the core network may transmit, and the RAN may receive, an energy usage policy (e.g., energy-related requirements and/or energy reporting requirements). As shown by reference number 620, the RAN provides a service to the UE. As shown by reference number 630, the RAN performs an energy computation based on the energy usage policy. As shown by reference number 640, the RAN transmits, and the core network receives, an energy report. As shown by reference number 650, the core network (e.g., the PCF) enforces an energy usage policy ("policy check"), and/or the core network (e.g., the CHF) implements charging. The core network may enforce the energy usage policy and/or implement the charging based on the energy report received from the RAN.

As indicated above, FIG. 6 is provided as an example. Other examples may differ from what is described with respect to FIG. 6.

Figure 7:
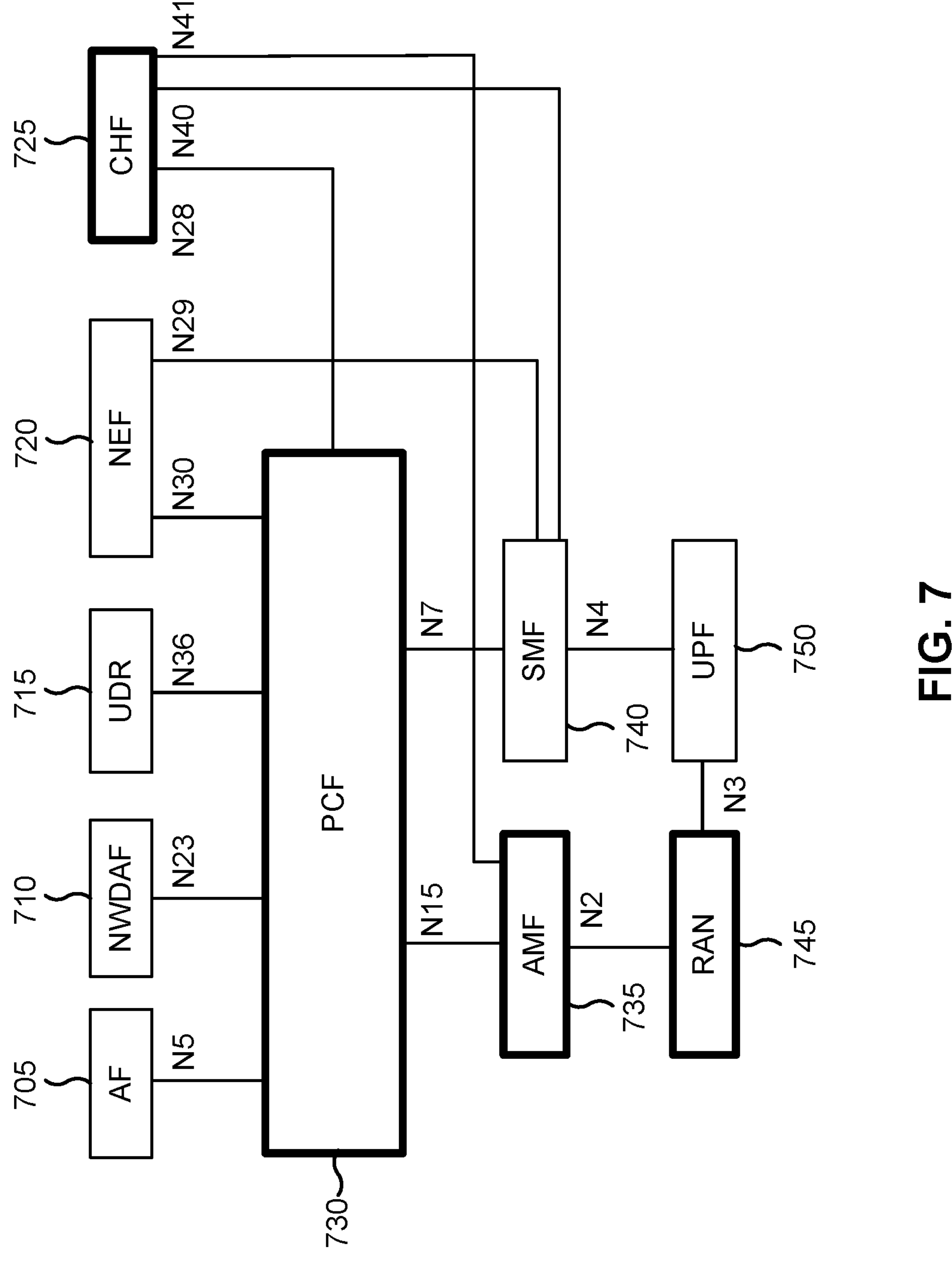
FIG. 7 is a diagram illustrating an example where an access and mobility management function (AMF) is an anchor point in a core network for energy usage management, in accordance with the present disclosure.

FIG. 7 is a diagram illustrating an example 700 where the AMF is an anchor point in the core network for energy usage management, in accordance with the present disclosure. FIG. 7 shows a 5G network architecture that includes an AF 705, an NWDAF 710, a UDR 715, an NEF 720, a CHF 725, a PCF 730, an AMF 735, an SMF 740, a RAN 745, and a UPF 750. Example 700 may generally involve communications between the RAN 745, AMF 735, PCF 730, and CHF 725.

In some aspects, the network entity may be AMF 735. In some examples, the AMF 735 may transmit the energy usage report configuration (e.g., the AMF 735 may forward the maximum energy usage to the RAN based on a received energy usage policy). For example, the AMF 735 may forward the energy usage policy to the RAN. For example, the AMF 735 may transfer energy usage policies (if any) associated with energy usage to the UE. In some examples, AMF 735 may receive reports of energy usage (e.g., the first energy usage report) from the RAN. In some examples, the AMF 735 may transmit the second energy usage report (e.g., the AMF 735 may report events associated with energy usage to the PCF or CHF based on configuration from the PCF).

In some aspects, the energy usage policy may be associated with a UE. For example, the energy usage policy may relate to (e.g., cover) all services accessed by the UE. The energy usage policy being associated with the UE may enable energy usage monitoring and/or charging on a per-UE basis.

In some aspects, the energy usage policy may be associated with a network slice associated with a UE. For example, the energy usage policy may relate to (e.g., cover) one or more services accessed by the UE via a network slice. The energy usage policy being associated with the network slice may enable energy usage monitoring and/or charging on a per-network-slice basis.

In some aspects, the AMF 735 may transmit, and the RAN 745 may receive, an indication of a service area restriction associated with energy usage. For example, the AMF 735 may receive service area restrictions for a UE associated with energy usage and introduce area restrictions to the UE based on the energy usage. The service area may be a tracking area. For example, the service area restriction may restrict a UE to being served on a given set or subset of tracking areas. For example, the energy usage policy may control which tracking areas the UE may be served on based on an amount of energy consumed by the UE, and the AMF 735 may forward the energy usage policy to the RAN 745. Transmitting the indication of the service area restriction may enable the RAN 745 to restrict service to the UE based on energy consumed by the UE.

In some aspects, the AMF 735 may receive subscription information associated with energy usage, and the energy usage may be associated with (e.g., the energy may be consumed by) a UE or a network slice (or a list of network slices) associated with the UE. For instance, the AMF 735 may receive the subscription information from the UDR 715. In some examples, the AMF 735 may report the subscription information to the PCF 730 (e.g., based on an occurrence of a trigger indicated by the PCF 730). In some examples, the AMF 735 may forward an indication of maximum energy usage to the RAN 745 based on the subscription information. Receiving the subscription information may enable subscription-information-based energy usage monitoring.

In some aspects, the AMF 735 may receive an SMF selection policy associated with energy usage, and the energy usage may be associated with (e.g., the energy may be consumed by) a UE. For example, the AMF 735 may receive a policy for selection of an SMF (e.g., SMF 740) based on energy usage associated with the UE. Receiving the SMF selection policy may enable the AMF 735 to select an SMF (e.g., SMF 740) based on the amount of energy consumed by the UE.

As indicated above, FIG. 7 is provided as an example. Other examples may differ from what is described with respect to FIG. 7.

Figure 8:
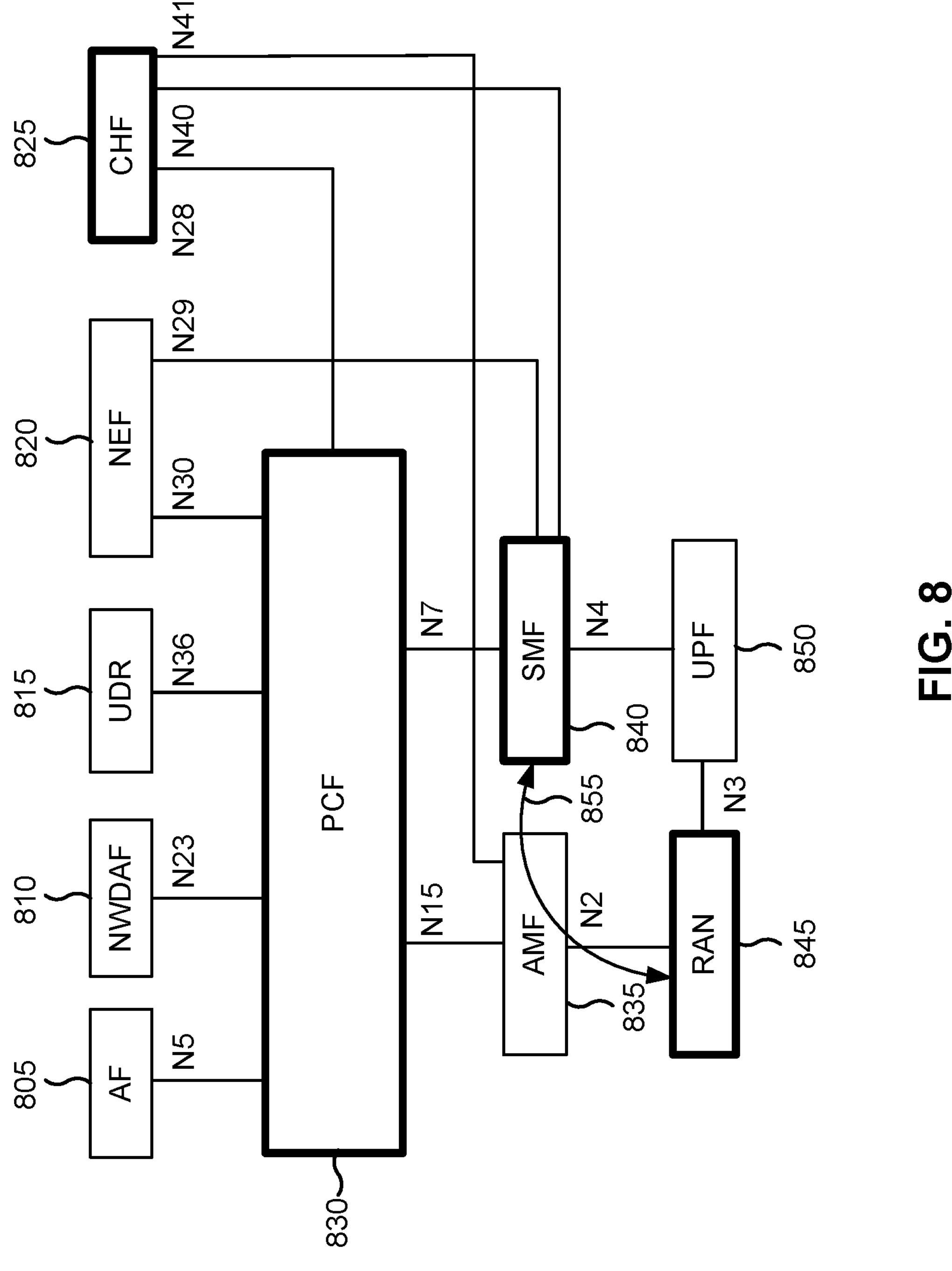
FIG. 8 is a diagram illustrating an example of where an session management function (SMF) is an anchor point in a core network for energy usage management, in accordance with the present disclosure.

FIG. 8 is a diagram illustrating an example 800 of where the SMF is an anchor point in the core network for energy usage management, in accordance with the present disclosure. FIG. 8 shows a 5G network architecture that includes an AF 805, an NWDAF 810, a UDR 815, an NEF 820, a CHF 825, a PCF 830, an AMF 835, an SMF 840, a RAN 845, and a UPF 850. Example 800 may generally involve communications between the RAN 845, UPF 850, SMF 840, PCF 830, and CHF 825. As shown by reference number 855, the SMF 840 may communicate with the RAN 845 via the AMF 835.

In some aspects, the network entity may be SMF 840. In some examples, the SMF 840 may transmit the energy usage report configuration (e.g., the SMF 840 may configure reporting of energy usage on the RAN 845 and/or the UPF 850 based on the energy usage policy). For example, the SMF 840 may configure reporting on the RAN 845 and/or the UPF 850 based on the energy usage policy. In some examples, SMF 840 may receive reports of energy usage (e.g., the first energy usage report) from the RAN 845 and/or the UPF 850. In some examples, SMF 840 may transmit the second energy usage report to the PCF 830 and/or the CHF 825. For example, the SMF 840 may transmit (e.g., report) an indication of energy usage to the PCF 830 and/or the CHF 825. The indication of energy usage may be based on the first energy usage report. The SMF 840 may report the energy usage based on a reporting configuration received from the PCF 830 and/or the CHF 825. If the second energy usage report is associated with energy usage monitoring, then the SMF 840 may transmit the second energy usage report to the PCF 830. If the second energy usage report is associated with charging, then the SMF 840 may transmit the second energy usage report to the CHF 825.

In some aspects, the energy usage policy may be associated with a PDU session. For example, the energy usage policy may relate to (e.g., cover) all services accessed by a UE within the PDU session. The energy usage policy being associated with the PDU session may enable energy usage monitoring and/or charging on a per-PDU-session basis.

In some aspects, the energy usage policy may be associated with a QoS flow. For example, the energy usage policy may relate to (e.g., cover) one or more services accessed by a UE via the QoS flow. The energy usage policy being associated with the QoS flow may enable energy usage monitoring and/or charging on a per-QoS-flow basis.

In some aspects, the SMF 840 may transmit the energy usage report configuration to the RAN 845, the UPF 850, and/or the CHF 825. For example, the SMF may forward at least part of the energy usage policy to the RAN 845, the UPF 850, and/or the CHF 825. For example, the SMF may forward an indication of the authorized energy usage, level of granularity (e.g., PDU session, QoS flow, or the like), association of energy usage monitoring/reporting/enforcement with a particular PDU session, SDF, or QoS flow, or the like.

In some aspects, the SMF 840 may further receive a data usage report associated with the second energy usage report. For example, the SMF 840 may receive the data usage report from the UPF 850. The data usage report may be associated with the second energy usage report in that the second energy usage report may include data usage information contained in the data usage report. In some examples (e.g., in a case where the SMF 840 receives the first energy usage report from the RAN 845), the SMF 840 may correlate the first energy usage report with the data usage report to generate the second energy usage report. In some examples (e.g., in a case where the SMF 840 receives the first energy usage report from the UPF 850), the UPF 850 may consolidate the first energy usage report and the data usage report, and the SMF 840 may receive the consolidated first energy usage report and data usage report. Receiving a data usage report associated with the second energy usage report may enable the SMF 840 to enrich the second energy usage report with data usage information.

In some aspects, the energy usage policy may be associated with an energy usage monitoring key. The energy usage monitoring key may be associated with energy usage (e.g., an amount of energy that the UE is authorized to consume). For example, the energy usage monitoring key may associate the first energy usage report and/or the second energy usage report with a specific SDF (or QoS flow, PDU session, or the like) that the SMF 840 is configured to report on.

In some aspects, the energy usage policy may be associated with a charging key. The charging key may be associated with energy usage (e.g., an amount of energy that the UE is authorized to consume). For example, the charging key may associate the first energy usage report and/or the second energy usage report with a specific SDF (or QoS flow or the like) that the SMF 840 is configured to report on.

In some aspects, the energy usage report configuration may include one or more indications of one or more of a periodicity associated with the second energy usage report, a triggering event associated with the second energy usage report, or a level of granularity associated with the second energy usage report. For example, the energy usage report configuration may include an indication of a periodicity of reporting (e.g., the energy usage report configuration may include an indication of a periodicity with which the SMF 840 is to transmit energy usage reports, such as the second energy usage report). Additionally, or alternatively, the energy usage report configuration may include an indication of an event for reporting (e.g., a triggering event that is to prompt the SMF 840 to transmit the second energy usage report). Additionally, or alternatively, the energy usage report configuration may include an indication of a level of granularity of reporting. For example, the energy usage report configuration may include an indication of the PDU session, SDF, QoS flow, or the like that the second energy usage report is to contain energy usage information on. The energy usage report configuration including the one or more indications of one or more of the periodicity associated with the second energy usage report, the triggering event associated with the second energy usage report, or the level of granularity associated with the second energy usage report may enable the CHF 825 and/or the PCF 830 to indicate, to the SMF 840, how to report energy usage information (e.g., periodicity, any triggering events, or the level(s) of granularity).

In some aspects, the second energy usage report may include an indication of the level of granularity. For example, the SMF 840 may indicate, to the CHF 825 and/or the PCF 830 in the second energy usage report, the PDU session, SDF, QoS flow, or the like that the second energy usage report is to contains energy usage information on. The second energy usage report including the indication of the level of granularity may enable the CHF 825 and/or the PCF 830 to determine the PDU session, SDF, QoS flow, or the like that is associated with the second energy usage report.

In some aspects, the SMF 840 may transmit the second energy usage report based at least in part on one or more of a start of a mode of operation associated with the UE, an energy usage associated with the UE satisfying an energy usage threshold, or expiry of credit associated with the UE. For example, the SMF 840 may report energy usage information to the CHF 825 and/or the PCF 830 in response to an occurrence of one or more of the start of the mode of operation, the energy usage satisfying the energy usage threshold, and/or the expiry of the credit. For example, the SMF 840 may transmit the second energy usage report in response to the start of a mode of operation to serve the UE. For example, the RAN 845 may enter a mode of operation for energy consumption. Additionally, or alternatively, the SMF 840 may transmit the second energy usage report in response to the energy usage of the UE reaching a limit (e.g., on a per-PDU-session basis, a per-SDF basis, a per-QoS-flow basis, or the like). Additionally, or alternatively, the SMF 840 may transmit the second energy usage report in response to the credit for energy usage allocated to the UE (at any suitable level of granularity) expiring.

In some aspects, the SMF 840 may receive credit associated with energy usage. For example, the SMF 840 may receive the credit from the CHF 825 and/or the PCF 830. The credit may be associated with a granularity of a service provided to the UE. For example, the CHF 825 may allocate the credit on a per-PDU-session basis, a per-SDF basis, a per-QoS-flow basis, or the like. In some examples, the SMF 840 may configure reporting on the RAN 845 and/or the UPF 850 to determine credit usage/expiry. In some examples, the SMF 840 may activate a data service on the RAN 845 and/or the UPF 850 based on the received credit and/or discontinue the data service on the RAN 845 and/or the UPF 850 upon expiry of the credit. Action taken by the SMF 840 upon credit expiry may be configured by the CHF 825 and/or the PCF 830, or the action may be based on an energy usage policy. In some examples, the SMF 840 may request the credit for energy usage from the CHF 825 and/or the PCF 830, and the SMF 840 may receive the credit based on the request.

In some aspects, the SMF 840 may transmit, based at least in part on the second energy usage report, an indication of a networking action. For example, the SMF 840 may indication the networking action to the RAN 845 and/or the UPF 850 based on a condition associated with energy usage. The networking action may include switching from one network node to another network node, stopping network traffic, or the like. The networking action may be based on a configuration (e.g., the energy usage configuration) received from the CHF 825 and/or the PCF 830. In some examples, the networking action may be associated with a particular level of granularity. For example, the SMF 840 may perform the networking action on a per-PDU-session basis, a per-SDF basis, a per-QoS-flow basis, or the like.

As indicated above, FIG. 8 is provided as an example. Other examples may differ from what is described with respect to FIG. 8.

Figure 9:
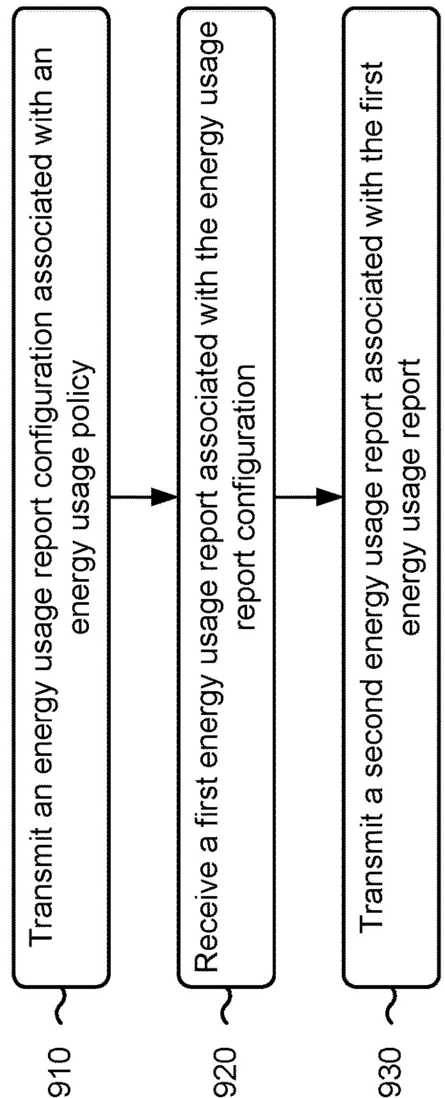
FIG. 9 is a diagram illustrating an example process performed, for example, at a network entity or an apparatus of a network entity, in accordance with the present disclosure.

FIG. 9 is a diagram illustrating an example process 900 performed, for example, at a network entity or an apparatus of a network entity, in accordance with the present disclosure. Example process 900 is an example where the apparatus or the network entity (e.g., the network entity of FIG. 5) performs operations associated with energy usage reporting.

As shown in FIG. 9, in some aspects, process 900 may include transmitting an energy usage report configuration associated with an energy usage policy (block 910). For example, the network entity (e.g., using transmission component 1204 and/or communication manager 1206, depicted in FIG. 12) may transmit an energy usage report configuration associated with an energy usage policy, as described above.

As further shown in FIG. 9, in some aspects, process 900 may include receiving a first energy usage report associated with the energy usage report configuration (block 920). For example, the network entity (e.g., using reception component 1202 and/or communication manager 1206, depicted in FIG. 12) may receive a first energy usage report associated with the energy usage report configuration, as described above.

As further shown in FIG. 9, in some aspects, process 900 may include transmitting a second energy usage report associated with the first energy usage report (block 930). For example, the network entity (e.g., using transmission component 1204 and/or communication manager 1206, depicted in FIG. 12) may transmit a second energy usage report associated with the first energy usage report, as described above.

Process 900 may include additional aspects, such as any single aspect or any combination of aspects described below and/or in connection with one or more other processes described elsewhere herein.

In a first aspect, the energy usage policy is associated with charging, and transmitting the second energy usage report includes transmitting the second energy usage report to a CHF.

In a second aspect, alone or in combination with the first aspect, the energy usage policy is associated with energy usage monitoring, and transmitting the second energy usage report includes transmitting the second energy usage report to a PCF.

In a third aspect, alone or in combination with one or more of the first and second aspects, transmitting the energy usage report configuration includes transmitting the energy usage report configuration to a network node, and receiving the first energy usage report includes receiving the first energy usage report from the network node.

In a fourth aspect, alone or in combination with one or more of the first through third aspects, the network entity is an AMF.

In a fifth aspect, alone or in combination with one or more of the first through fourth aspects, the energy usage policy is associated with a UE.

In a sixth aspect, alone or in combination with one or more of the first through fifth aspects, the energy usage policy is associated with a network slice associated with a UE.

In a seventh aspect, alone or in combination with one or more of the first through sixth aspects, process 900 includes transmitting an indication of a service area restriction associated with energy usage.

In an eighth aspect, alone or in combination with one or more of the first through seventh aspects, process 900 includes receiving subscription information associated with energy usage, and the energy usage is associated with a UE or with a network slice associated with the UE.

In a ninth aspect, alone or in combination with one or more of the first through eighth aspects, process 900 includes receiving an SMF selection policy associated with energy usage, and the energy usage is associated with a UE.

In a tenth aspect, alone or in combination with one or more of the first through ninth aspects, the network entity is an SMF.

In an eleventh aspect, alone or in combination with one or more of the first through tenth aspects, the energy usage policy is associated with a PDU session.

In a twelfth aspect, alone or in combination with one or more of the first through eleventh aspects, the energy usage policy is associated with a QoS flow.

In a thirteenth aspect, alone or in combination with one or more of the first through twelfth aspects, transmitting the energy usage report configuration includes transmitting the energy usage report configuration to a UPF.

In a fourteenth aspect, alone or in combination with one or more of the first through thirteenth aspects, the process 900 includes receiving a data usage report associated with the second energy usage report.

In a fifteenth aspect, alone or in combination with one or more of the first through fourteenth aspects, the energy usage policy is associated with an energy usage monitoring key.

In a sixteenth aspect, alone or in combination with one or more of the first through fifteenth aspects, the energy usage policy is associated with a charging key.

In a seventeenth aspect, alone or in combination with one or more of the first through sixteenth aspects, the energy usage report configuration includes one or more indications of one or more of a periodicity associated with the second energy usage report, a triggering event associated with the second energy usage report, or a level of granularity associated with the second energy usage report.

In an eighteenth aspect, alone or in combination with one or more of the first through seventeenth aspects, the second energy usage report includes an indication of the level of granularity.

In a nineteenth aspect, alone or in combination with one or more of the first through eighteenth aspects, transmitting the second energy usage report includes transmitting the second energy usage report based at least in part on one or more of a start of a mode of operation associated with a UE, an energy usage associated with the UE satisfying an energy usage threshold, or expiry of credit associated with the UE.

In a twentieth aspect, alone or in combination with one or more of the first through nineteenth aspects, process 900 includes receiving credit associated with energy usage.

In a twenty-first aspect, alone or in combination with one or more of the first through twentieth aspects, process 900 includes transmitting, based at least in part on the second energy usage report, an indication of a networking action.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
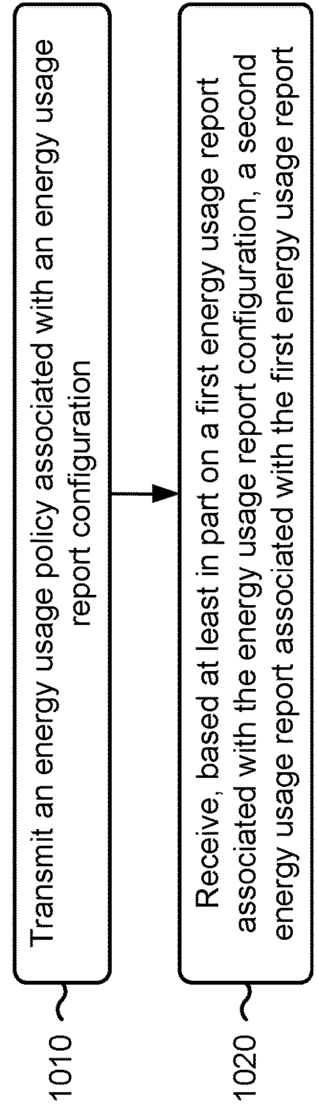
FIG. 10 is a diagram illustrating an example process performed, for example, at a policy control function (PCF) entity or an apparatus of a PCF entity, in accordance with the present disclosure.
Figure 10:

FIG. 10 is a diagram illustrating an example process 1000 performed, for example, at a PCF entity or an apparatus of a PCF entity, in accordance with the present disclosure. Example process 1000 is an example where the apparatus or the PCF entity (e.g., the PCF of FIG. 5) performs operations associated with energy usage reporting.

As shown in FIG. 10, in some aspects, process 1000 may include transmitting an energy usage policy associated with an energy usage report configuration (block 1010). For example, the PCF entity (e.g., using transmission component 1204 and/or communication manager 1206, depicted in FIG. 12) may transmit an energy usage policy associated with an energy usage report configuration, as described above.

As further shown in FIG. 10, in some aspects, process 1000 may include receiving, based at least in part on a first energy usage report associated with the energy usage report configuration, a second energy usage report associated with the first energy usage report (block 1020). For example, the PCF entity (e.g., using reception component 1202 and/or communication manager 1206, depicted in FIG. 12) may receive, based at least in part on a first energy usage report associated with the energy usage report configuration, a second energy usage report associated with the first energy usage report, as described above.

Process 1000 may include additional aspects, such as any single aspect or any combination of aspects described below and/or in connection with one or more other processes described elsewhere herein.

In a first aspect, transmitting the energy usage policy includes transmitting the energy usage policy to an AMF, and receiving the second energy usage report includes receiving the second energy usage report from the AMF.

In a second aspect, alone or in combination with the first aspect, transmitting the energy usage policy includes transmitting the energy usage policy to an SMF, and receiving the second energy usage report includes receiving the second energy usage report from the SMF.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
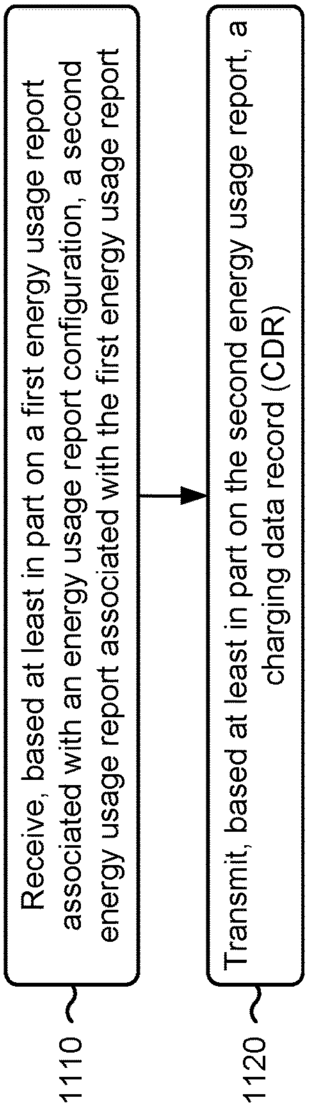
FIG. 11 is a diagram illustrating an example process performed, for example, at an charging function (CHF) entity or an apparatus of an CHF entity, in accordance with the present disclosure.
Figure 11:

FIG. 11 is a diagram illustrating an example process 1100 performed, for example, at an CHF entity or an apparatus of an CHF entity, in accordance with the present disclosure. Example process 1100 is an example where the apparatus or the CHF entity (e.g., the CHF of FIG. 5) performs operations associated with energy usage reporting.

As shown in FIG. 11, in some aspects, process 1100 may include receiving, based at least in part on a first energy usage report associated with an energy usage report configuration, a second energy usage report associated with the first energy usage report (block 1110). For example, the CHF entity (e.g., using reception component 1202 and/or communication manager 1206, depicted in FIG. 12) may receive, based at least in part on a first energy usage report associated with an energy usage report configuration, a second energy usage report associated with the first energy usage report, as described above.

As further shown in FIG. 11, in some aspects, process 1100 may include transmitting, based at least in part on the second energy usage report, a CDR (block 1120). For example, the CHF entity (e.g., using transmission component 1204 and/or communication manager 1206, depicted in FIG. 12) may transmit, based at least in part on the second energy usage report, a CDR, as described above.

Process 1100 may include additional aspects, such as any single aspect or any combination of aspects described below and/or in connection with one or more other processes described elsewhere herein.

In a first aspect, receiving the second energy usage report includes receiving the second energy usage report from an AMF.

In a second aspect, alone or in combination with the first aspect, receiving the second energy usage report includes receiving the second energy usage report from a SMF.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
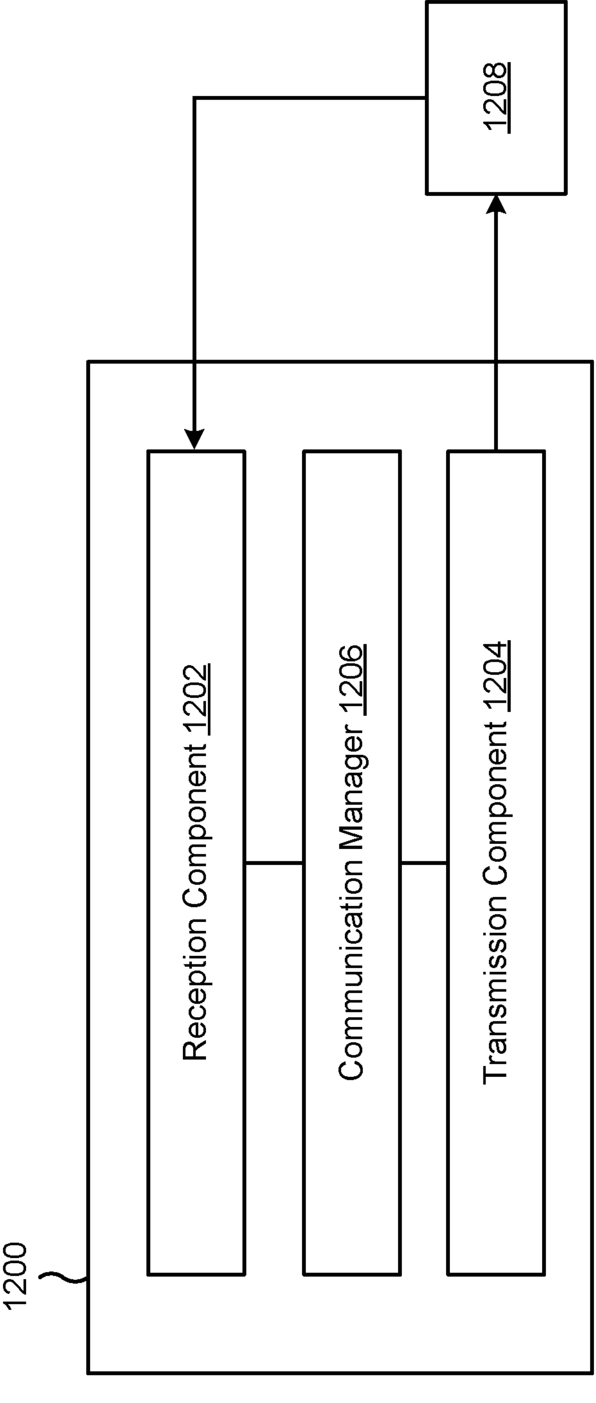
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity, or a network entity may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the network entity described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the network entity described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit an energy usage report configuration associated with an energy usage policy. The reception component 1202 may receive a first energy usage report associated with the energy usage report configuration. The transmission component 1204 may transmit a second energy usage report associated with the first energy usage report.

The transmission component 1204 may transmit an indication of a service area restriction associated with energy usage.

The reception component 1202 may receive subscription information associated with energy usage, wherein the energy usage is associated with a UE or with a network slice associated with the UE.

The reception component 1202 may receive an SMF selection policy associated with energy usage, wherein the energy usage is associated with a UE.

The reception component 1202 may receive credit associated with energy usage.

The transmission component 1204 may transmit, based at least in part on the second energy usage report, an indication of a networking action.

The transmission component 1204 may transmit an energy usage policy associated with an energy usage report configuration. The reception component 1202 may receive, based at least in part on a first energy usage report associated with the energy usage report configuration, a second energy usage report associated with the first energy usage report.

The reception component 1202 may receive, based at least in part on a first energy usage report associated with an energy usage report configuration, a second energy usage report associated with the first energy usage report. The transmission component 1204 may transmit, based at least in part on the second energy usage report, a CDR.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network entity comprising: transmitting an energy usage report configuration associated with an energy usage policy; receiving a first energy usage report associated with the energy usage report configuration; and transmitting a second energy usage report associated with the first energy usage report.

Aspect 2: The method of Aspect 1, wherein the energy usage policy is associated with charging, and wherein transmitting the second energy usage report includes transmitting the second energy usage report to a CHF.

Aspect 3: The method of any of Aspects 1-2, wherein the energy usage policy is associated with energy usage monitoring, and wherein transmitting the second energy usage report includes transmitting the second energy usage report to a PCF.

Aspect 4: The method of any of Aspects 1-3, wherein transmitting the energy usage report configuration includes transmitting the energy usage report configuration to a network node, and wherein receiving the first energy usage report includes receiving the first energy usage report from the network node.

Aspect 5: The method of any of Aspects 1-4, wherein the network entity is an AMF.

Aspect 6: The method of Aspect 5, wherein the energy usage policy is associated with a UE.

Aspect 7: The method of Aspect 5, wherein the energy usage policy is associated with a network slice associated with a UE.

Aspect 8: The method of Aspect 5, further comprising: transmitting an indication of a service area restriction associated with energy usage.

Aspect 9: The method of Aspect 5, further comprising: receiving subscription information associated with energy usage, wherein the energy usage is associated with a UE or with a network slice associated with the UE.

Aspect 10: The method of Aspect 5, further comprising: receiving an SMF selection policy associated with energy usage, wherein the energy usage is associated with a UE.

Aspect 11: The method of any of Aspects 1-10, wherein the network entity is an SMF.

Aspect 12: The method of Aspect 11, wherein the energy usage policy is associated with a PDU session.

Aspect 13: The method of Aspect 11, wherein the energy usage policy is associated with a QoS flow.

Aspect 14: The method of Aspect 11, wherein transmitting the energy usage report configuration includes transmitting the energy usage report configuration to a UPF.

Aspect 15: The method of Aspect 11, further comprising: receiving a data usage report associated with the second energy usage report.

Aspect 16: The method of Aspect 11, wherein the energy usage policy is associated with an energy usage monitoring key.

Aspect 17: The method of Aspect 11, wherein the energy usage policy is associated with a charging key.

Aspect 18: The method of Aspect 11, wherein the energy usage report configuration includes one or more indications of one or more of a periodicity associated with the second energy usage report, a triggering event associated with the second energy usage report, or a level of granularity associated with the second energy usage report.

Aspect 19: The method of Aspect 18, wherein the second energy usage report includes an indication of the level of granularity.

Aspect 20: The method of Aspect 11, wherein transmitting the second energy usage report includes transmitting the second energy usage report based at least in part on one or more of a start of a mode of operation associated with a UE, an energy usage associated with the UE satisfying an energy usage threshold, or expiry of credit associated with the UE.

Aspect 21: The method of Aspect 11, further comprising: receiving credit associated with energy usage.

Aspect 22: The method of Aspect 11, further comprising: transmitting, based at least in part on the second energy usage report, an indication of a networking action.

Aspect 23: A method of wireless communication performed by a PCF entity comprising: transmitting an energy usage policy associated with an energy usage report configuration; and receiving, based at least in part on a first energy usage report associated with the energy usage report configuration, a second energy usage report associated with the first energy usage report.

Aspect 24: The method of Aspect 23, wherein transmitting the energy usage policy includes transmitting the energy usage policy to an AMF, and wherein receiving the second energy usage report includes receiving the second energy usage report from the AMF.

Aspect 25: The method of any of Aspects 23-24, wherein transmitting the energy usage policy includes transmitting the energy usage policy to an SMF, and wherein receiving the second energy usage report includes receiving the second energy usage report from the SMF.

Aspect 26: A method of wireless communication performed by a CHF entity comprising: receiving, based at least in part on a first energy usage report associated with an energy usage report configuration, a second energy usage report associated with the first energy usage report; and transmitting, based at least in part on the second energy usage report, a CDR.

Aspect 27: The method of Aspect 26, wherein receiving the second energy usage report includes receiving the second energy usage report from an AMF.

Aspect 28: The method of any of Aspects 26-27, wherein receiving the second energy usage report includes receiving the second energy usage report from an SMF.

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-28.

Aspect 30: An apparatus for wireless communication at a device, the apparatus comprising one or more memories and one or more processors coupled to the one or more memories, the one or more processors configured to cause the device to perform the method of one or more of Aspects 1-28.

Aspect 31: An apparatus for wireless communication, the apparatus comprising at least one means for performing the method of one or more of Aspects 1-28.

Aspect 32: A non-transitory computer-readable medium storing code for wireless communication, the code comprising instructions executable by one or more processors to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

Aspect 34: A device for wireless communication, the device comprising a processing system that includes one or more processors and one or more memories coupled with the one or more processors, the processing system configured to cause the device to perform the method of one or more of Aspects 1-28.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A session management function (SMF) entity for wireless communication, comprising:

one or more memories; and one or more processors, coupled to the one or more memories, which are configured, individually or in any combination, to:

transmit an energy usage report configuration associated with an energy usage policy that is associated with an energy usage monitoring key;

receive a first energy usage report associated with the energy usage report configuration; and transmit a second energy usage report associated with the first energy usage report.

2. The SMF entity of claim 1, wherein the energy usage policy is associated with charging, and wherein the one or more processors, to transmit the second energy usage report, are configured to transmit the second energy usage report to a charging function (CHF).

3. The SMF entity of claim 1, wherein the energy usage policy is associated with energy usage monitoring, and wherein the one or more processors, to transmit the second energy usage report, are configured to transmit the second energy usage report to a policy control function (PCF).

4. The SMF entity of claim 1, wherein the one or more processors, to transmit the energy usage report configuration, are configured to transmit the energy usage report configuration to a network node, and wherein the one or more processors, to receive the first energy usage report, are configured to receive the first energy usage report from the network node.

5. The SMF entity of claim 1, wherein the energy usage policy is further associated with a user equipment (UE).

6. The SMF entity of claim 1, wherein the energy usage policy is further associated with a network slice associated with a user equipment (UE).

7. The SMF entity of claim 1, wherein the one or more processors are further configured, individually or in any combination, to:

transmit an indication of a service area restriction associated with energy usage.

8. The SMF entity of claim 1, wherein the one or more processors are further configured, individually or in any combination, to:

receive subscription information associated with energy usage, wherein the energy usage is associated with a user equipment (UE) or with a network slice associated with the UE.

9. The SMF entity of claim 1, wherein the one or more processors are further configured, individually or in any combination, to:

identify a session management function (SMF) selection policy associated with energy usage, wherein the energy usage is associated with a user equipment (UE).

10. The SMF entity of claim 1, wherein the energy usage policy is further associated with a protocol data unit (PDU) session.

11. The SMF entity of claim 1, wherein the energy usage policy is further associated with a quality of service (QoS) flow.

12. The SMF entity of claim 1, wherein the one or more processors, to transmit the energy usage report configuration, are configured to transmit the energy usage report configuration to a user plane function (UPF).

13. The SMF entity of claim 1, wherein the one or more processors are further configured, individually or in any combination, to:

receive a data usage report associated with the second energy usage report.

14. The SMF entity of claim 1, wherein the energy usage policy is further associated with a charging key.

15. The SMF entity of claim 1, wherein the energy usage report configuration includes one or more indications of one or more of a periodicity associated with the second energy usage report, a triggering event associated with the second energy usage report, or a level of granularity associated with the second energy usage report.

16. The SMF entity of claim 15, wherein the second energy usage report includes an indication of the level of granularity.

17. The SMF entity of claim 1, wherein the one or more processors, to transmit the second energy usage report, are configured to transmit the second energy usage report based at least in part on one or more of a start of a mode of operation associated with a user equipment (UE), an energy usage associated with the UE satisfying an energy usage threshold, or expiry of credit associated with the UE.

18. The SMF entity of claim 1, wherein the one or more processors are further configured, individually or in any combination, to:

receive credit associated with energy usage.

19. The SMF entity of claim 1, wherein the one or more processors are further configured, individually or in any combination, to:

transmit, based at least in part on the second energy usage report, an indication of a networking action.

20. A method of wireless communication performed by a session management function (SMF) entity comprising:

transmitting an energy usage report configuration associated with an energy usage policy that is associated with an energy usage monitoring key;

receiving a first energy usage report associated with the energy usage report configuration; and transmitting a second energy usage report associated with the first energy usage report.

21. The method of claim 20, wherein transmitting the energy usage report configuration includes transmitting the energy usage report configuration to a network node, and wherein receiving the first energy usage report includes receiving the first energy usage report from the network node.

22. The method of claim 20, wherein the energy usage policy is further associated with charging, and wherein the second energy usage report is transmitted to a charging function (CHF).

23. The method of claim 20, wherein the energy usage policy is further associated with energy usage monitoring, and wherein the second energy usage report is transmitted to a policy control function (PCF).

24. The method of claim 20, wherein the energy usage policy is further associated with a protocol data unit (PDU) session.

25. The method of claim 20, wherein the energy usage policy is further associated with a quality of service (QoS) flow.

26. The method of claim 20, wherein the energy usage report configuration is transmitted to a user plane function (UPF).

27. The method of claim 20, further including the step of:

receiving a data usage report associated with the second energy usage report.

28. The method of claim 20, wherein the energy usage policy is further associated with a charging key.

29. The method of claim 20, wherein the energy usage report configuration includes one or more indications of one or more of a periodicity associated with the second energy usage report, a triggering event associated with the second energy usage report, or a level of granularity associated with the second energy usage report.

30. The method of claim 29, wherein the second energy usage report includes an indication of the level of granularity.

* * * * *